United States Patent [19]

Blanchard et al.

[11] Patent Number: 5,298,584
[45] Date of Patent: Mar. 29, 1994

[54] ANIONICALLY DYEABLE SMOOTH-DRY CROSSLINKED CELLULOSIC MATERIAL CREATED BY TREATMENT OF CELLULOSE WITH REACTIVE SWELLING AGENTS AND NITROGEN BASED COMPOUNDS

[75] Inventors: Eugene J. Blanchard, Metairie; Robert M. Reinhardt, New Orleans, both of La.

[73] Assignee: The United States of America as represented by the Secretary of Agriculture, Washington, D.C.

[21] Appl. No.: 627,470

[22] Filed: Dec. 14, 1990

[51] Int. Cl.$^5$ .............. D06M 13/00; D06M 13/325; D06M 13/35; C08B 15/00
[52] U.S. Cl. .................................. 527/300; 527/312; 536/56; 536/84; 536/85
[58] Field of Search ................ 527/300, 312; 536/56, 536/84, 85; 8/120

[56] References Cited

U.S. PATENT DOCUMENTS

| | | | |
|---|---|---|---|
| 3,290,310 | 12/1966 | Morf et al. | 544/113 |
| 3,788,804 | 1/1974 | Harper, Jr. et al. | 8/18 |
| 3,807,946 | 4/1974 | Harper, Jr. et al. | 8/18 |
| 3,853,459 | 12/1974 | Harper, Jr. et al. | 8/18 |
| 4,225,310 | 9/1980 | Acton et al. | 8/602 |
| 4,417,898 | 11/1983 | Hasler et al. | 8/543 |
| 4,629,468 | 12/1986 | Engelhard et al. | 8/120 |
| 4,743,266 | 5/1988 | Harper, Jr. | 8/918 |
| 4,780,102 | 10/1988 | Harper, Jr. | 8/196 |
| 4,950,306 | 8/1990 | Marte et al. | 8/652 |
| 5,139,530 | 8/1992 | Blanchard et al. | 8/125 |
| 5,242,463 | 9/1993 | Blanchard et al. | 8/196 |

Primary Examiner—John Kight, III
Assistant Examiner—Jeffrey Culpeper Mullis
Attorney, Agent, or Firm—Joseph A. Lipovsky; M. Howard Silverstein; John D. Fado

[57] ABSTRACT

Anionically dyeable smooth-dry crosslinked cellulose is produced by modifying cellulose-containing material with the combination of a hydroxyalkylamine or a hydroxyalkyl quaternary ammonium salt, one or more glycols, and a crosslinking agent. The reaction is typically catalyzed with salts such as zinc nitrate or magnesium chloride used either alone or in conjunction with citric acid. Types of usable anionic dyes include acid, direct, and reactive dyes. The cellulose-containing material may be in the form of fibers, threads, linters, roving, fabrics, yarns, slivers and paper.

35 Claims, No Drawings

ANIONICALLY DYEABLE SMOOTH-DRY CROSSLINKED CELLULOSIC MATERIAL CREATED BY TREATMENT OF CELLULOSE WITH REACTIVE SWELLING AGENTS AND NITROGEN BASED COMPOUNDS

BACKGROUND OF THE INVENTION

1. Field of the Invention

This invention relates to dyeable cellulosic material and its creation by means of crosslinking a cellulosic material with a crosslinking agent which is further modified by both one or more glycol swelling agents and one or more salts of a hydroxyalkylamine or a hydroxyalkyl quaternary ammonium compound.

2. Description of the Prior Art

Cellulosic fabrics do not possess smooth-dry (durable press or wash wear) performance or dimensional stability. In order to acquire these properties, cellulosic fabric requires a chemical finish. The chemical agents used in these processes are known as crosslinking agents. Examples of some agents are dimethylol dihydroxyethyleneurea (DMDHEU) or dimethylol propylcarbamate (DMPC).

While treatment of cellulosic fabric with a crosslinking agent does make the fabric smooth drying and dimensionally stabilized, it reduces the dyeability of cellulose by causing the cellulosic fibers to become fixed in a collapsed state upon their being cured at elevated temperature. Therefore, modern textile processes require fabric to be dyed first and then finished for smooth dry performance. When fabrics are crosslinked with common and readily available agents, such as DMDHEU or DMPC, subsequent dyeing has been unsuccessful.

Previously, crosslinking agents and reactive additives have been utilized as a route to dyeable crosslinked fabrics. U.S. Pat. No. 3,788,804 teaches the use of crosslinking agents and hydroxycarboxylic acids to form crosslinked fabrics with acidic grafts, and dyeing the fabrics with basic dyes. Also, U.S. Pat. No. 3,807,946 teaches the use of crosslinking agents and a reactive additive such as triethanolamine to form a crosslinked fabric with a grafted amine and dyeing such with an acid dye. U.S. Pat. No. 3,853,459 utilizes a treatment of crosslinking agent and polymer to form a durable-press fabric with a polymeric treatment and dyeing with a disperse dyestuff.

These patents have in common the teaching of dyeing modified cellulosic fabrics with non-cellulosic dyestuffs. Consequently, the performance of these dyes on a cellulosic substrate is not as good as cellulose dyed with normal dyestuffs such as direct or reactive dyes which are usually used on cellulosic fabrics.

U.S. Pat. No. 4,780,102 teaches improved dyeing properties for cotton finished with both a crosslinking agent and polyethylene glycol. Fabric treated according to this method can be dyed with dyes normally used with untreated cotton, such as direct and reactive dyes, but color strength is adversely affected with the increasing molecular weight of the dye. Usually, the color strength of the finished-crosslinked material is not as good as that of the untreated cotton. Also, such fabric cannot be dyed with acid dyes nor with reactive dyes under acidic conditions.

SUMMARY OF THE INVENTION

This invention describes the production of crosslinked cellulosic materials that have smooth drying properties as well as enhanced affinity for anionic dyestuffs. The method involves treating cellulosic material with a crosslinking agent, a catalyst, one or more glycol swelling agents, and one or more of a hydroxyalkylamine or a hydroxyalkyl quaternary ammonium compound, followed by drying and curing to react the components with the cellulosic material. The cured material can then be dyed with anionic dyestuffs to produce colored, wrinkle-resistant cellulosic material.

Therefore, it is an object of this invention to produce cellulosic materials which are readily dyeable with anionic dyes under acidic conditions, which cellulosic materials previously have been crosslinked with a methylolamide crosslinking agent in the presence of one or more glycol swelling agents, and one or more of a hydroxyalkylamine or a hydroxyalkyl quaternary ammonium compound.

Another object of the invention is to perform the dyeing step under neutral to acidic conditions, thereby eliminating the need for other bases, added salts such as carbonates, and standard salts normally used in cellulosic fabric dyeing procedures.

Another object of the invention is to enable the dyeing of crosslinked cellulosic materials with high molecular-weight anionic dyes.

Still another object of the invention is to provide a wide variety of multicolored effects by combining treated and untreated cellulosic yarns in cotton fabrics.

Other objects and advantages of the invention will become readily apparent from the ensuing description.

DETAILED DESCRIPTION OF THE INVENTION

The present invention is based upon the discovery that the dyeability of smooth-dry crosslinked cellulose with regard to anionic dyestuffs is markedly enhanced over that previously achieved in the prior art. This is accomplished by reactively incorporating both one or more glycols and one or more of a salt of a hydroxyalkylamine compound or a hydroxyalkyl quaternary ammonium salt into the matrix of a cellulose substrate by means of a methylolamide crosslinking agent which in and of itself gives cellulose durable press properties.

The underlying theory behind the instant invention is that the reactive incorporation of both 1) a hydroxyalkylamine or a hydroxyalkyl quaternary ammonium compound and 2) a glycol into the structure of a methylolamide crosslinked cellulose respectively 1) alters the charge of the structure and 2) swells the cellulose during the crosslinking process so that a more open structure, which allows larger dye molecules to interact with the cellulose, is produced.

This structure, altered in terms of both charge and density, is amenable to dyeing with agents including anionic dyestuffs. The most marked improvement over the prior art is noted with anionic dyes having molecular weights from about 750 to about 1500. These dyes are already conventional in the textile industry as dyestuffs for non-crosslinked cellulose.

The process to produce the crosslinked cellulosic product of the instant invention may be accomplished by treating the cellulosic material with an aqueous formulation comprising a methylolamide crosslinking agent, a catalyst, one or more glycols and one or more of a hydroxyalkylamine salt or a hydroxyalkyl quaternary ammonium salt; with subsequent drying and curing.

The present invention is applicable to fibrous cellulosic material including cotton, flax, jute, hemp, ramie and regenerated unsubstituted wood celluloses such as rayon. Combinations of said cellulosics and combinations of said cellulosics with other fibers such as polyesters, nylons, acrylics, and the like also can be treated. The disclosed process may be applied to fibrous cellulosic material in the form of woven and non-woven textiles such as yarns and woven or knit fabrics, and to fibers, threads, linters, roving, slivers or paper. The disclosed process is most advantageous with material containing about 50%–100% cellulose. The preferred material is cotton.

A wide variety of compounds may be used as the crosslinking agent of the invention. Useful compounds include methylolamides, methylolated ureas, cyclic ureas, urons, triazones, carbamates, and triazines, as well as alkylated and hydroxyalkylated derivatives thereof. A non-limitative list of typical agents includes dimethylol urea, partially methylolated urea, dimethylol ethyleneurea, dimethylol dihydroxyethyleneurea, dimethylol propyleneurea, dimethylol substituted propyleneurea, tri- and tetramethylol acetyleneurea, bis(methoxymethyl)uron, dimethylol methyl carbamate, dimethylol propyl carbamate, methylolated melamines, methyoxymethylolated melamines, and the like. The especially preferred crosslinking agent is dimethylol dihydroxyethyleneurea (DMDHEU). The amount of crosslinking agent used is from about 3% to about 15% by weight of the formulation, with the preferred amount ranging from about 4% to about 8%. Should too little crosslinking agent be used, a product possessing the enhanced dyeing properties of the instant invention will not be acquired.

A reaction catalyst, which aids in the crosslinking of the cellulosic substrate with the methylolamide compound is present in the formulation in the amount of about 10% to about 60% based on the weight of the methylolamide crosslinking agent. Catalysts which can be used include: various mineral acids; organic acids; salts of strong acids, ammonium salts, alkanolamine salts, metallic salts; and combinations of the above. Useable compounds of such catalyst classes include but are not limited to the following:

a. Mineral acids such as hydrochloric acid, sulfuric acid, nitric acid, phosphoric acid and boric acid.

b. Organic acids such as oxalic acid, tartaric acid, citric acid, malic acid, glycolic acid, methoxyacetic acid, cloroacetic acid, lactic acid, 3-hydroxybutyric acid, methanesulfonic acid, ethanesulfonic acid, hydroxymethanesulfonic acid, benzenesulfonic acid, p-toluenesulfonic acid, cyclopentanetetracarboxylic acid, butanetetracarboxylic acid, tetrahydrofurantetracarboxylic acid, nitrilotriacetic acid, and ethylenediaminetetraacetic acid.

c. Salts of strong acids such as sodium bisulfate, sodium dihydrogen phosphate and disodium hydrogen phosphate.

d. Ammonium salts such as ammonium chloride, ammonium nitrate, ammonium sulfate, ammonium bisulfate, ammonium dihydrogen phosphate and diammonium hydrogen phosphate.

e. Alkanolamine salts such as the hydrochloride, nitrate, sulfate, phosphate and sulfamate salts of 2-amino-2-methyl-1-propanol, tris(hydroxymethyl)aminomethane and 2-amino-2-ethyl-1,3-propanediol.

f. Metal salts such as aluminum chlorhydroxide, aluminum chloride, aluminum nitrate, aluminum sulfate, magnesium chloride, magnesium nitrate, magnesium sulfate, zinc chloride, zinc nitrate and zinc sulfate.

Preferred catalysts include the halide and nitrate salts of zinc or magnesium used either alone or in conjunction with citric acid. Preferred salts are zinc nitrate and magnesium chloride. A preferred mixed catalyst system is contemplated to contain a molar ratio of about 20:1 to about 5:1 of a metal salt to citric acid.

Usable glycols in the instant invention include glycerol, ethylene glycol and polyethylene glycols ranging in molecular weight from about 200 to about 3400. The glycols may be used either singly or in combination. The amount of glycol used is from about 2% to about 50% by weight of the formulation, with the preferred amount ranging from about 5% to about 20%.

The hydroxyalkylamine salt may be a primary, secondary or tertiary amine and may possess one, two, or three hydroxyalkyl groups. Usable compounds include halide salts of monoethanolamine, diethanolamine, triethanolamine, methyldiethanolamine, 2-amino-2-ethyl-1,3-propanediol, 2-amino-2-methyl-1-propanol, 2-dimethylamino-2-methyl-1-propanol, N-methyldiethanolamine, and tris(hydroxymethyl)aminomethane. In a preferred embodiment the hydroxyalkylamine is used in its hydrochloride form. Preferred hydroxyalkylamines include hydroxymethylamine, hydroxyethylamine and triethanolamine. The most preferred hydroxyalkylamine is triethanolamine. This is due to its possession of the maximum number of hydroxyethyl groups, which is responsible for both its low amine odor and high level of activity with the crosslinking agent.

In an alternate embodiment the hydroxyalkylamines may be introduced into the formulation in their non-salt form, but are then converted to their respective salts by reaction with the appropriate reagent prior to the addition of the catalyst.

The hydroxyalkyl quaternary ammonium salts envisioned for use in the reaction formulation include both the halide and sulfate salts of said compounds. Among the halide salts the chloride salt is preferred. Among the sulfate salts the dialkyl sulfate salts are preferred; with the dimethyl sulfate salts and diethyl sulfate salts being especially preferred. Examples of useable compounds include (2-hydroxyethyl)trimethylammonium chloride and bis(2-hydroxyethyl)dimethylammonium chloride.

The sum total amount of the hydroxyalkylamine salt and/or the hydroxyalkyl quaternary ammonium salt used in the formulation is from about 3% to about 15% by weight of the formulation.

The balance of the crosslinking formulation is represented by an aqueous solvent system which may be either water or a mixed system comprising either a water/alcohol mixture or a water/acetone mixture in a volumetric proportional ratio of about 99:01 to about 80:20. Useable alcohols include alkanols of 1 to 6 carbons; with ethanol being preferred. It should be noted that the glycol component of the formulation is not defined in this invention as being a component of a mixed solvent system, but rather as a reactant. The amount of solvent used is from about 10% to about 90% by weight of the formulation, with a preferred amount ranging from about 15% to about 75%.

The processes of instant invention are carried out by first contacting the cellulosic material with the aqueous crosslinking formulation containing a methylolamide crosslinking agent, a catalyst, one or more glycols and one or more of a hydroxyalkylamine salt or a hydroxyalkyl quaternary ammonium salt. This may be done by spraying or immersion of the material in a bath of the crosslinking formulation. After being thoroughly wetted in the treating bath, the cellulosic material may be passed between squeeze rolls to remove excess liquid. Alternatively, low wet pickup techniques of application (sometimes called minimum add-on application) may be employed, such as by kiss roll, foam finishing, loop padding, spraying, printing, or other methods known in the art. The material is then dried at any convenient temperature just sufficient to remove the solvent within the desired amount of time. The material is then cured for about 15 seconds to about 5 minutes at an inversely corresponding temperature range of about 220° C. to about 100° C. Alternatively the above drying step can be omitted, and the material can be flash-cured to remove the solvent at the same time that the crosslinking of the cellulose takes place. If desired, the cured material may subsequently be given a water rinse to remove unreacted reagents and curing catalyst, and may then be redried. The fabrics may then be dyed after curing.

The fabrics can be dyed with acid, direct, and reactive classes of anionic dyes at a pH from about 2 to about 5, with the preferred pH being from about 3 to about 4. The dyebath pH can be adjusted to the proper level by adding a sufficient quantity of acetic acid or other suitable acid. Of the classes of dyes listed, unmodified cellulose has very little or no affinity for acid dyes under any pH conditions. Unmodified cellulose has affinity for reactive dyes only when the dyes are fixed to cellulose under alkaline pH conditions. When unmodified cellulose is dyed with these dyes, a salt such as sodium chloride or sodium sulfate, must be added to the dyebath for proper exhaustion of dye into the fiber. In contrast, the modified material of the invention can be dyed effectively without utilizing any salt. However, if desired, from about 1% to about 2% of salt by weight of the dye solution can be used in the dyebath with any of acid, direct or reactive dyes.

The following examples are intended only to further illustrate the invention and are not intended to limit the scope of the invention which is defined by the claims, with all percentages herein disclosed being by weight unless otherwise specified.

Color strength was determined by means of a spectrophotometer and is expressed in terms of K/S values as utilized in the Kubelka-Munk equation. Procedures based on the Kubelka-Munk equation are used to measure dye absorption. This procedure utilizes a dilute dye solution to determine the wavelength of maximum dye absorption of a given dyestuff. Reflectance of the dyed fabric is measured at that wavelength. In the Kubelka-Munk equation $$K/S = \frac{(1-R)^2}{2R}$$

where
K = light absorption coefficient;
S = light scattering coefficient; and
R = reflectance or reflection factor.

The K/S value is directly related to the color intensity of the fabric. Once reflectance, R, is determined, K/S can readily be calculated. The higher the K/S value, the greater the color depth and hence the greater the dye absorption in dyeing. For example, the K/S value of mercerized cotton control is greater than that of untreated cotton control, reflecting the greater dyeability of cotton fabrics after mercerization.

K/S values are also used to approximate the color strength of a sample relative to that of cellulosic control, which is simultaneously dyed in the same dye bath. Thus, the K/S of a sample divided by the K/S of untreated cellulose control (either mercerized or unmercerized) times 100 equals the percent dye absorbed relative to the untreated cotton control.

All the crosslinked samples in the examples had smooth-drying properties both before and after dyeing. Of course, cotton finished with methylolamide crosslinking agent, but without any of the nitrogenous additives, had no affinity for acid and reactive dyes and hardly had any affinity for direct dyes. The K/S values of such dyed samples, used for purposes of comparison, were only 0.5, 1, and 3 for Direct Red 80, 79, and 81, respectively. Similar results were obtained on the same crosslinked cottons when other direct dyes were used.

EXAMPLES 1-6

C.I. Direct Red 79 (Molecular Weight=961). A series of aqueous solutions were prepared containing polyethylene glycol with an average molecular weight of 400 (PEG 400) at the concentrations listed in Table I, along with 6% triethanolamine hydrochloride, 6% dimethyloldihydroxyethyleneurea, 1.8% magnesium chloride hexahydrate/citric acid catalyst mixture (10:1 molar ratio), and 0.1% nonionic wetting agent. Desized, scoured, and bleached mercerized cotton printcloth was padded with each of the formulations to 90% wet pickup. Each fabric was dried at 60° C. for 7 minutes, cured at 160° C. for 3 minutes, washed in water to remove any unreacted material, and dried. Each sample of fabric was dyed with an aqueous solution containing 3% C.I. Direct Red 79 (based on the weight of the sample) and 1% sodium chloride (based on the weight of the solution) at 95° C. for 60 minutes according to conventional procedures, except that the dyebath was adjusted to pH 3 with acetic acid. After the samples were washed and dried, color strength (K/S value, supra) was determined by means of a spectrophotometer.

The K/S values in Table I show that polyethylene glycol in the formulations is effective in improving the color strength of the dyed crosslinked material over a wide concentration range. At even the lowest level of PEG 400 (Example 5), the K/S value was substantially better than that for the sample without PEG 400 (Example 6).

TABLE I

| Example | % PEG 400 | K/S Value |
|---|---|---|
| 1 | 30 | 20.9 |
| 2 | 20 | 22.4 |
| 3 | 15 | 24.1 |
| 4 | 10 | 19.9 |
| 5 | 5 | 14.8 |
| 6 | 0 | 8.2 |

EXAMPLES 7-12

C.I. Direct Blue 78 (molecular weight > 1100). The procedures of Examples 1-6 were repeated except that C.I. Direct Blue 78 was substituted for C.I. Direct Red 79. The results in Table II show that PEG 400 improves dyeing with a direct dye of relatively high molecular weight.

TABLE II

| Example | % PEG 400 | K/S Value |
| --- | --- | --- |
| 7 | 30 | 22.6 |
| 8 | 20 | 24.3 |
| 9 | 15 | 23.2 |
| 10 | 10 | 23.9 |
| 11 | 5 | 20.6 |
| 12 | 0 | 12.5 |

EXAMPLES 13-16

C.I. Reactive Blue 193. The procedures for Examples 1-6 were repeated except that the concentrations of PEG 400 were as listed in Table III, C.I. Reactive Blue 193 was substituted for C.I. Direct Red 79, and no salt was present in the dye bath. The results in Table III show that PEG 400 is effective in increasing the color strength of samples dyed with a reactive dye at pH 3. By comparison, an untreated cotton fabric sample had a K/S value of 1.1, indicating that there was virtually no inherent affinity of the cellulosic material for the dye under these conditions.

TABLE III

| Example | % PEG 400 | K/S Value |
| --- | --- | --- |
| 13 | 15 | 15.9 |
| 14 | 10 | 17.6 |
| 15 | 5 | 19.8 |
| 16 | 0 | 11.9 |

EXAMPLES 17-22

Milder Catalyst. The procedures of Examples 1-6 were repeated except that the molar ratio of ingredients in the catalyst mixture was 20:1 instead of 10:1. The results in Table IV show that even a milder catalytic system is effective in promoting sufficient crosslinking of the reaction components to give improved dyeability with C.I. Direct Red 79.

TABLE IV

| Example | % PEG 400 | K/S Value |
| --- | --- | --- |
| 17 | 30 | 19.3 |
| 18 | 20 | 19.6 |
| 19 | 15 | 20.7 |
| 20 | 10 | 22.6 |
| 21 | 5 | 20.3 |
| 22 | 0 | 12.8 |

EXAMPLES 23-28

C.I. Direct Red 80 (Molecular Weight=1241). The procedures of Examples 17-22 were repeated except that C.I. Direct Red 80 was substituted for C.I. Direct Red 79. The results in Table V show that crosslinked cotton containing PEG 400 can be dyed effectively with a high-molecular-weight dye.

TABLE V

| Example | % PEG 400 | K/S Value |
| --- | --- | --- |
| 23 | 30 | 19.4 |
| 24 | 20 | 19.5 |
| 25 | 15 | 20.3 |
| 26 | 10 | 21.9 |
| 27 | 5 | 17.9 |
| 28 | 0 | 9.4 |

EXAMPLES 29-34

C.I. Acid Red 114 (Molecular Weight=820). The procedures of Examples 17-22 were repeated except that C.I. Acid Red 114 was substituted for C.I. Direct Red 79. The results in Table VI show that dyeability of crosslinked cotton containing PEG 400 is markedly greater than that of crosslinked cotton without polyethylene glycol when an acid dye is used. This class of dye has no affinity for unmodified cotton or for crosslinked cotton without suitable additives.

TABLE VI

| Example | % PEG 400 | K/S Value |
| --- | --- | --- |
| 29 | 30 | 20.2 |
| 30 | 20 | 22.2 |
| 31 | 15 | 24.3 |
| 32 | 10 | 27.7 |
| 33 | 5 | 27.6 |
| 34 | 0 | 16.7 |

EXAMPLES 35-40

Catalyst Without Acid. The procedures of Examples 1-6 were repeated except that the catalyst was 1.8% magnesium chloride hexahydrate alone instead of the mixed catalyst, and C.I. Direct Red 80 was substituted for C.I. Direct Red 79. The results in Table VII show that a metal salt catalyst is effective in promoting sufficient crosslinking of the reaction components to give improved dyeability with a high-molecular-weight dye.

TABLE VII

| Example | % PEG 400 | K/S Value |
| --- | --- | --- |
| 35 | 30 | 19.9 |
| 36 | 20 | 19.9 |
| 37 | 15 | 21.0 |
| 38 | 10 | 23.3 |
| 39 | 5 | 21.1 |
| 40 | 0 | 12.9 |

EXAMPLES 41-46

C.I. Direct Blue 80 (Molecular Weight=966). The procedures of Examples 35-40 were repeated except that the fabric samples were dyed with C.I. Direct Blue 80. The results in Table VIII show that the color strength of the cellulosic material treated with polyethylene glycol is superior to that of the same material without glycol.

TABLE VIII

| Example | % PEG 400 | K/S Value |
| --- | --- | --- |
| 41 | 30 | 17.1 |
| 42 | 20 | 17.5 |
| 43 | 15 | 19.0 |
| 44 | 10 | 20.5 |
| 45 | 5 | 20.2 |
| 46 | 0 | 13.1 |

EXAMPLES 47-54

Various Glycols, C.I. Direct Red 79. The procedures of Examples 17-22 were repeated except that the glycols listed in Table IX were used in the aqueous formulations, all at a concentration of 20%. The results with C.I. Direct Red 79 are given in Table IX.

TABLE IX

| Example | Glycol | Molecular weight | K/S Value |
|---|---|---|---|
| 47 | Ethylene glycol | 62 | 19.8 |
| 48 | Glycerol | 92 | 16.0 |
| 49 | PEG 200 | 200 | 20.0 |
| 50 | PEG 400 | 400 | 21.7 |
| 51 | PEG 1000 | 1000 | 23.3 |
| 52 | PEG 1450 | 1450 | 22.7 |
| 53 | PEG 3350 | 3350 | 22.0 |
| 54 | None (control) | | 12.8 |

EXAMPLES 55-62

Various Glycols, C.I. Direct Red 80. The procedures of Examples 47-54 were repeated except that fabric samples were dyed with C.I. Direct Red 80. The results are given in Table X.

TABLE X

| Example | Glycol | Molecular weight | K/S Value |
|---|---|---|---|
| 55 | Ethylene glycol | 62 | 20.0 |
| 56 | Glycerol | 92 | 13.6 |
| 57 | PEG 200 | 200 | 20.4 |
| 58 | PEG 400 | 400 | 22.3 |
| 59 | PEG 1000 | 1000 | 23.3 |
| 60 | PEG 1450 | 1450 | 21.2 |
| 61 | PEG 3350 | 3350 | 20.7 |
| 62 | None (control) | | 9.4 |

EXAMPLES 63-70

Various Glycols, C.I. Acid Red 114. The procedures of Examples 47-54 were repeated except that fabric samples were dyed with C.I. Acid Red 114. The results in Table XI show that the glycols were very effective in improving the dyeability of the crosslinked cotton, but that glycerol had a detrimental effect on dyeing with an acid dye. Analogous results were obtained when glycerol-treated materials were dyed with direct dyes as in Examples 47-54 and 55-62 (supra).

TABLE XI

| Example | Glycol | Molecular weight | K/S Value |
|---|---|---|---|
| 63 | Ethylene glycol | 62 | 21.4 |
| 64 | Glycerol | 92 | 5.1 |
| 65 | PEG 200 | 200 | 20.2 |
| 66 | PEG 400 | 400 | 23.3 |
| 67 | PEG 1000 | 1000 | 25.6 |
| 68 | PEG 1450 | 1450 | 25.5 |
| 69 | PEG 3350 | 3350 | 24.8 |
| 70 | None (control) | | 16.7 |

EXAMPLES 71-76

Quaternary Ammonium Compound, C.I. Direct Blue 78. The procedures of Examples 7-12 were repeated except that (2-hydroxyethyl)trimethylammonium chloride was substituted for triethanolamine hydrochloride. The results in Table XII show that polyethylene glycol improves the dyeability of crosslinked cotton fabrics containing a hydroxyalkyl quaternary ammonium compound when such fabrics are dyed with a relatively high molecular weight dye.

TABLE XII

| Example | % PEG 400 | K/S Value |
|---|---|---|
| 71 | 30 | 24.1 |
| 72 | 20 | 24.4 |

TABLE XII-continued

| Example | % PEG 400 | K/S Value |
|---|---|---|
| 73 | 15 | 24.9 |
| 74 | 10 | 25.8 |
| 75 | 5 | 21.2 |
| 76 | 0 | 17.3 |

EXAMPLES 77-82

Quaternary Ammonium Compound, C.I. Direct Red 80. The procedures of Examples 71-76 were repeated except that C.I. Direct Red 80 was substituted for C.I. Direct Blue 78. The results in Table XIII show that polyethylene glycol improves the dyeability of crosslinked cotton fabrics containing a hydroxyalkyl quaternary ammonium compound when such fabrics are dyed with a high-molecular-weight direct dye.

TABLE XIII

| Example | % PEG 400 | K/S Value |
|---|---|---|
| 77 | 30 | 27.6 |
| 78 | 20 | 25.9 |
| 79 | 15 | 27.4 |
| 80 | 10 | 22.7 |
| 81 | 5 | 20.5 |
| 82 | 0 | 16.4 |

EXAMPLES 83-86

Cotton Single Knits, C.I. Direct Red 80. The procedures of Examples 1-6 were repeated except that the aqueous formulations contained PEG 400 at the concentrations listed in Table XIV, the concentration of dimethyloldihydroxyethyleneurea was 5% instead of 6%, cotton single-knit fabric was substituted for cotton printcloth, and C.I. Direct Red 80 was substituted for C.I. Direct Red 79. The results in Table XIV show that the fabrics that were treated with glycol had better color strength than the control sample without glycol.

TABLE XIV

| Example | % PEG 400 | K/S Value |
|---|---|---|
| 83 | 6 | 20.1 |
| 84 | 4 | 20.1 |
| 85 | 2 | 17.5 |
| 86 | 0 | 13.8 |

EXAMPLES 87-90

Cotton Single Knits, C.I. Direct Yellow 106. The procedures of Examples 83-86 were repeated except that C.I. Direct Yellow 106 was substituted for C.I. Direct Red 80. The results in Table XV are similar to those in Table XIV.

TABLE XV

| Example | % PEG 400 | K/S Value |
|---|---|---|
| 87 | 6 | 12.9 |
| 88 | 4 | 10.2 |
| 89 | 2 | 8.6 |
| 90 | 0 | 6.1 |

It is understood that the foregoing detailed description is given merely by way of illustration and that modification and variations may be made therein without departing from the spirit and scope of the invention.

We claim:

1. A process comprising contacting a non-dyed cellulosic substrate with: a crosslinking agent, comprising an aqueous composition, in an amount ranging from about 3% to about 15% by weight of the composition selected from the group consisting of methylolamides, methylolated ureas, cyclic ureas, urons, triazones, carbamates, triazines and alkylated and hydroxyalkylated derivatives thereof, at least one glycol, in an amount ranging from about 2% to about 50% by weight of the formulation, selected from the group consisting of glycerol, ethylene glycol and polyethylene glycol at least one salt of a hydroxyalkylamine compound or a hydroxyalkyl quaternary ammonium salt, in an amount ranging from about 3% to about 15% by weight of the composition, and a catalyst which catalyzes both the binding of said methylolamide crosslinking agent to said substrate and the binding of said glycols and hydroxyalkylamine from said salt of a hydroxyalkylamine compound or a hydroxyalkyl quaternary ammonium compound from said hydroxyalkyl quaternary ammonium salt to said methylolamide crosslinking agent; under conditions whereby said methylolamide crosslinking agent binds to said substrate, and at least one of said glycols and at least one of said hydroxyalkylamine from said salt of a hydroxyalkylamine compound or said hydroxyalkyl quaternary ammonium compound from said hydroxyalkyl quaternary ammonium salt, bind to said methylolamide to produce a crosslinked cellulose.

2. The process of claim 1 wherein said crosslinking agent is selected from the group consisting of dimethyloldihydroxyethyleneurea, dimethylolurea, partially methylolated urea, dimethylolethyleneurea, dimethylol propyleneurea, trimethylol acetyleneurea, tetramethylol acetyleneurea, bis(methoxymethyl)uron, dimethylol methyl carbamate, dimethylol n-propyl carbamate, dimethylol isopropyl carbamate, trimethylolated melamine, tris(methoxymethyl)melamine, and hexa(methoxymethyl) melamine.

3. The process of claim 1 wherein said glycol is at least one of ethylene glycol, or a polyethylene glycol having a molecular weight from about 200 to about 3400, or glycerol.

4. The process of claim 1 wherein said salt of a hydroxyalkylamine compound is a halo salt and said hydroxyalkyl quaternary ammonium salt is a halo or sulfate salt.

5. The process of claim 1 wherein said hydroxyalkylamine is a primary, secondary or tertiary hydroxyalkylamine; or mixtures thereof.

6. The process of claim 5 wherein said hydroxyalkylamine is selected from the group consisting of monomethanolamine, diethanolamine, triethanolamine, methyldiethanolamine, 2-amino-2-ethyl-1,3-propandiol, 2-amino-2-methyl-1-propanol, 2-dimethylamino-2-methyl-1-propanol, N-methyldiethanolamine, and tris(hydroxymethyl) aminomethane, or mixtures thereof.

7. The process of claim 1 wherein said hydroxyalkyl quaternary ammonium salt is bis(2-hydroxyethyl)dimethylammonium chloride, (2-hydroxyethyl)trimethylammonium chloride, or mixtures thereof.

8. The process of claim 1 wherein said catalyst is a halide or nitrate salt of zinc or magnesium either alone or in combination with citric acid.

9. The process of claim 8 wherein said catalyst is magnesium chloride either alone or in combination with citric acid.

10. The process of claim 1 wherein the cellulose component of said cellulosic substrate is selected from the group consisting of cotton, rayon, jute, ramie and flax.

11. The process of claim 1 wherein said cellulosic substrate is in a form selected from the group consisting of fibers, threads, linters, roving, fabrics, yarns, slivers and paper.

12. The process of claim 1 further including the steps of drying and curing said crosslinked cellulose.

13. The process of claim 12 further including a step of dyeing the dried and cured crosslinked cellulose with an anionic dye.

14. The process of claim 13 wherein said anionic dye has a molecular weight of from about 750 to about 1500.

15. A non-dyed crosslinked cellulosic reaction product comprising: a cellulosic substrate; a crosslinking agent selected from the group consisting of methylolamides, methylolated ureas, cyclic ureas, urons, triazones, carbamates, triazines and alkylated and hydroxyalkylated derivatives thereof bound to said cellulosic substrate; and at least one glycol selected from the group consisting of glycerol, ethylene glycol and polyethylene glycol and at least one of a hydroxyalkylamine or a hydroxyalkyl quaternary ammonium compound chemically bound to said methylolamide crosslinking agent; produced by the process of claim 14.

16. The crosslinked cellulosic reaction product of claim 15 wherein said crosslinking agent is selected from the group consisting of dimethyloldihydroxyethyleneurea, dimethylolurea, partially methylolated urea, dimethylolethyleneurea, dimethylol propyleneurea, trimethylol acetyleneurea, tetramethylol acetyleneurea, bis(methoxymethyl)uron, dimethylol methyl carbamate, dimethylol n-propyl carbamate, dimethylol isopropyl carbamate, trimethylolated melamine, tris(methoxymethyl)melamine, and hexa(methoxymethyl)melamine.

17. The crosslinked cellulosic reaction product of claim 15 wherein said glycol is at least one of ethylene glycol, or a polyethylene glycol having a molecular weight from about 200 to about 3400, or glycerol.

18. The crosslinked cellulosic reaction product of claim 15 wherein said hydroxyalkylamine is a primary, secondary, or tertiary hydroxyalkylamine; or mixtures thereof.

19. The crosslinked cellulosic reaction product of claim 18 wherein said hydroxyalkylamine is selected from the group consisting of monoethanolamine, diethanolamine, triethanolamine, methyldiethanolamine, 2-amino-2-ethyl--1,3-propandiol, 2-amino-2-methyl-1-propanol, 2-dimethylamine-2-methyl-1-propanol, N-methyldiethanolamine, and tris(hydroxymethyl) aminomethane, or mixtures thereof.

20. The crosslinked cellulosic reaction product of claim 18 wherein said hydroxyalkylamine is hydroxymethylamine, hydroxyethylamine, triethanolamine or mixtures thereof.

21. The crosslinked cellulosic reaction product of claim 15 wherein said hydroxyalkyl quaternary ammonium compound is one of (2-hydroxyalkyl)trimethylammonium chloride, bis(2-hydroxyethyl)dimethylammonium chloride or mixtures thereof.

22. The crosslinked cellulosic reaction product of claim 15 having an anionic dye subsequently bound thereto.

23. The crosslinked cellulosic reaction product of claim 22 wherein said anionic dye has a molecular weight of from about 750 to about 1500.

24. The crosslinked cellulosic reaction product of claim 22 wherein said anionic dye is an acid dye, a direct dye or a reactive dye.

25. The crosslinked cellulosic reaction product of claim 15 wherein the cellulose component of said cellulosic substrate is selected from the group consisting of cotton, rayon, jute, ramie and flax.

26. The crosslinked cellulosic reaction product of claim 15 wherein said cellulosic substrate is in a form selected from the group consisting of fibers, threads, linters, roving, fabrics, yarns, slivers and paper.

27. An aqueous composition comprising: a crosslinking agent, in an amount ranging from about 3% to about 15% by weight of the composition selected from the group consisting of methylolamides, methylolated ureas, cyclic ureas, urons, triazones, carbamates, triazines and alkylated and hydroxyalkylated derivatives thereof, at least one glycol, in an amount ranging from about 2% to about 50% by weight of the formulation, selected from the group consisting of glycerol, ethylene glycol and polyethylene glycol, one or more of a salt of a hydroxyalkylamine compound or a hydroxyalkyl quaternary ammonium salt, in an amount ranging from about 3% to about 15% by weight of the composition, and a catalyst, in an amount ranging from about 10% to about 60% by weight of the crosslinking agent which is capable of both binding of said methylolamide crosslinking agent to a cellulose substrate and binding of said glycols and at least one of a hydroxyalkylamine from said salt of a hydroxyalkylamine compound or a hydroxyalkyl quaternary ammonium compound from said hydroxyalkyl quaternary ammonium salt to said methylolamide crosslinking agent.

28. The composition of claim 27 wherein said crosslinking agent is selected from the group consisting of dimethyloldihydroxyethyleneurea, dimethylolurea, partially methylolated urea, dimethylolethyleneurea, dimethylol propyleneurea, trimethylol acetyleneurea, tetramethylol acetyleneurea, bis(methoxymethyl)uron, dimethylol methyl carbamate, dimethylol n-propyl carbamate, dimethylol isopropyl carbamate, trimethylolatedmelamine, tri(methoxymethyl)melamine, and hexa(methoxymethyl) melamine.

29. The composition of claim 27 wherein said glycol is one or more ethylene glycol, a polyethylene glycol having a molecular weight from about 200 to about 3400, or glycerol.

30. The composition of claim 27 wherein said salt of a hydroxyalkylamine compound is a halo salt and said hydroxyalkyl quaternary ammonium salt is a halo or sulfate salt.

31. The composition of claim 27 wherein said hydroxyalkylamine is a primary, secondary or tertiary hydroxyalkylamine; or mixtures thereof.

32. The composition of claim 31 wherein said hydroxyalkylamine is selected from the group consisting of monomethanolamine, monoethanolamine, diethanolamine, triethanolamine, methyldiethanolamine, 2-amino-2-ethyl-1,3-propandiol, 2-amino-2-methyl-1-propanol, 2-dimethylamino-2-methyl-1-propanol, N-methyldiethanolamine, and tris(hydroxymethyl)aminomethane, or mixtures thereof.

33. The composition of claim 27 wherein said hydroxyalkyl quaternary ammonium salt is bis(2-hydroxyethyl)dimethylammonium chloride, (2-hydroxyethyl)trimethylammonium chloride, or mixtures thereof.

34. The composition of claim 27 wherein said catalyst is a halide or nitrate salt of zinc or magnesium either alone or in combination with citric acid.

35. The composition of claim 34 wherein said catalyst is magnesium chloride either alone or in combination with citric acid.

* * * * *

UNITED STATES PATENT AND TRADEMARK OFFICE
CERTIFICATE OF CORRECTION

PATENT NO. : 5,298,584
DATED : February 22, 1994
INVENTOR(S) : Gary W. Thome et al.

It is certified that error appears in the above-identified patent and that said Letters Patent is hereby corrected as shown below:

Column 12,
Line 34, after "while the" insert -- BUFFER2 116 controls the upper data bits MDB<31..16>. --.

Signed and Sealed this

Twenty-second Day of November, 2005

JON W. DUDAS
*Director of the United States Patent and Trademark Office*

UNITED STATES PATENT AND TRADEMARK OFFICE
CERTIFICATE OF CORRECTION

PATENT NO. : 5,298,584 Page 1 of 1
DATED : March 29, 1994
INVENTOR(S) : Eugene J. Blanchard et al.

It is certified that error appears in the above-identified patent and that said Letters Patent is hereby corrected as shown below:

This certificate supersedes Certificate of Correction issued November 22, 2005, the number was erroneously mentioned and should be vacated since no Certificate of Correction was granted.

Signed and Sealed this

Thirty-first Day of January, 2006

JON W. DUDAS
*Director of the United States Patent and Trademark Office*